(12) United States Patent
Yang

(10) Patent No.: US 11,156,438 B2
(45) Date of Patent: Oct. 26, 2021

(54) STUN GUN WITH ILLUMINATION AND SIREN

(71) Applicant: PINGHU ANDUN SAFETY TECHNOLOGY CO., LTD, Pinghu (CN)

(72) Inventor: Limei Yang, Pinghu (CN)

(*) Notice: Subject to any disclaimer, the term of this patent is extended or adjusted under 35 U.S.C. 154(b) by 107 days.

(21) Appl. No.: 16/246,498

(22) Filed: Jan. 13, 2019

(65) Prior Publication Data

US 2019/0360784 A1    Nov. 28, 2019

(30) Foreign Application Priority Data

May 22, 2018   (CN) .......................... 201810494192.4

(51) Int. Cl.
| | | |
|---|---|---|
| *F41H 13/00* | (2006.01) | |
| *F21V 33/00* | (2006.01) | |
| *G08B 7/06* | (2006.01) | |
| *H02J 7/00* | (2006.01) | |
| *F21Y 115/10* | (2016.01) | |

(52) U.S. Cl.
CPC ..... *F41H 13/0018* (2013.01); *F21V 33/0076* (2013.01); *G08B 7/06* (2013.01); *H02J 7/00* (2013.01); *H02J 7/0047* (2013.01); *F21Y 2115/10* (2016.08)

(58) Field of Classification Search
CPC ............ F41H 13/0012; F41H 13/0018; F21V 33/0076
See application file for complete search history.

(56) References Cited

U.S. PATENT DOCUMENTS

| | | | | |
|---|---|---|---|---|
| 3,803,463 | A * | 4/1974 | Cover | F41H 13/0006 361/232 |
| 4,703,402 | A * | 10/1987 | Hsieh | F21V 33/0064 340/392.3 |
| 2016/0327375 | A1* | 11/2016 | Alherimi | F41H 13/0018 |
| 2018/0320888 | A1* | 11/2018 | Nawaz | F21L 4/005 |

* cited by examiner

*Primary Examiner* — Jared Fureman
*Assistant Examiner* — Christopher J Clark
(74) *Attorney, Agent, or Firm* — W&KIP

(57) ABSTRACT

The invention relates to a stun gun with illumination and siren. The stun gun generates a high-voltage pulse instantaneously through the transformer, stuns the contacted creature into dazed or shock for self-defense. The function of existing stun gun is relatively single, and the structure is not compact enough, it is inconvenient for use. If integrating more function in the existing stun gun, the structure of the stun gun will be complicated and it will be even more inconvenient for use.

10 Claims, 3 Drawing Sheets

STUN GUN WITH ILLUMINATION AND SIREN

TECHNICAL FIELD

The invention relates to an illuminating and alarming stun gun.

BACKGROUND ART

A stun gun is also called a stun stick, a stun rod, an electric baton, etc., and is a tool configured for self-defense, self-protection, anti-riot, security, etc. The stun gun generates a high-voltage pulse instantaneously through a transformer to stun or shock a creature in contact for the objective of the self-defense. An existing stun gun is single in function, not compact enough in structure and inconvenient to use. It is more likely to make a structure complicated and the use more inconvenient if more functions are integrated on the existing stun gun.

SUMMARY OF THE INVENTION

In view of the above situation, in order to solve the problems existing in the above-mentioned art, the invention provides an illuminating and alarming stun gun, which includes a main body shell and a single-chip microcomputer integrated circuit board arranged inside the main body shell, wherein a high-voltage generator, an alarm generator and LED strobe warning light and a rechargeable battery are further arranged inside the main body shell, the high-voltage generator, the alarm generator and LED strobe warning light and the rechargeable battery being connected to the single-chip microcomputer integrated circuit board separately; four stun pins are arranged at the head of the main body shell, an LED light emitting source being arranged among the four stun pins, and the LED light emitting source being in control connection to the single-chip microcomputer integrated circuit board and in power supply connection to the rechargeable battery; stun pins 61 of the main body shell 1 are provided with separate DC high-voltage discharge sheets 62, the DC high-voltage discharge sheets being in control connection to the single-chip microcomputer integrated circuit board 1 and in power supply connection to the rechargeable battery 9; the high-voltage generator 3 includes a DC inverse voltage transformer, a high-voltage silicon rectifier, a ceramic capacitor boost circuit and a discharge resistor which are in sequential connection, the DC inverse voltage transformer being connected to the rechargeable battery 9, and the discharge resistor being connected to the stun pins 61 and the DC high-voltage discharge sheets 62; and shielding films are installed on a line output transformer side of the single-chip microcomputer integrated circuit board 2 and a line output transformer side of the high-voltage generator 3 separately, a negative electrode being additionally connected to the shielding films.

In the illuminating and alarming stun gun according to the embodiments of the invention, preferably, the main body shell is provided with a stun and LED illumination switch which is connected to the single-chip microcomputer integrated circuit board and accesses an on-off control circuit of the LED light emitting source.

In the illuminating and alarming stun gun according to the embodiments of the invention, preferably, the alarm generator and LED strobe warning light includes a loud speaker and strobe warning light which is connected to the single-chip microcomputer integrated circuit board and controlled by the same to give an alarm sound.

In the illuminating and alarming stun gun according to the embodiments of the invention, preferably, the main body shell is provided with an alarm issuing hole, the loud speaker and strobe warning light being installed on an inner side of the alarm issuing hole; and an alarm and strobe warning light switch is arranged on an outer side of the main body shell, the alarm and strobe warning light switch being connected to the single-chip microcomputer integrated circuit board and accessing an on-off control circuit of the loud speaker and strobe warning light.

In the illuminating and alarming stun gun according to the embodiments of the invention, preferably, the main body shell is provided with a DC high-voltage switch, the DC high-voltage switch being connected to the single-chip microcomputer integrated circuit board and accessing an on-off control circuit of the stun pins and the DC high-voltage discharge sheets.

In the illuminating and alarming stun gun according to the embodiments of the invention, preferably, a DC5V DC voltage USB charging socket is arranged at the bottom of the main body shell, the DC5V DC voltage USB charging socket being in power supply connection to the rechargeable battery.

In the illuminating and alarming stun gun according to the embodiments of the invention, preferably, the main body shell is provided with a master power switch, the master power switch being connected to the single-chip microcomputer integrated circuit board and accessing a connection circuit of the rechargeable battery.

In the illuminating and alarming stun gun according to the embodiments of the invention, preferably, the main body shell is provided with a power amount display and charging indication display light, the power amount display and charging indication display light being connected to the single-chip microcomputer integrated circuit board and accessing a power amount monitoring circuit arranged on the single-chip microcomputer integrated circuit board, and the power amount monitoring circuit being connected to the rechargeable battery; and further, the power amount display and charging indication display lights are three LED lights.

In the illuminating and alarming stun gun according to the embodiments of the invention, preferably, the main body shell is of a long cylindrical plastic structure with a constricted waist.

In the illuminating and alarm stun gun according to the embodiments of the invention, preferably, the stun pins and the DC high-voltage discharge sheets are annularly and uniformly distributed.

In the illuminating and alarming stun gun according to the embodiments of the invention, preferably, the LED emitting light source is an XML2LED light.

After using the technologies provided by the invention, the beneficial effects of the illuminating and alarming stun gun according to the embodiments of the invention lie in that the stun gun integrates multiple functions such as illumination, alarm and stun into a whole, is compact in structure and convenient to control and use, and can be subjected to program setting through the single-chip microcomputer integrated circuit board, so as to control on-off sequences and modes of each of all the functions, and become the controllable intelligent stun gun with various application modes.

DETAILED DESCRIPTION OF EMBODIMENTS

Each preferred implementation of the invention will be described below with reference to the accompanying drawings. The description with reference to the accompanying drawings below is provided to assist in understanding the exemplary implementation of the invention defined by the claims and the equivalents thereof, including various specific details conducive to understanding, which can merely be regarded as exemplary. Therefore, it will be recognized by a person skilled in the art that various changes and modifications may be made to the implementation described herein without departing from the scope and spirit of the invention. In addition, in order to make the specification clearer and conciser, the detailed description of functions and configurations well-known in the art will be omitted.

Figure 1:
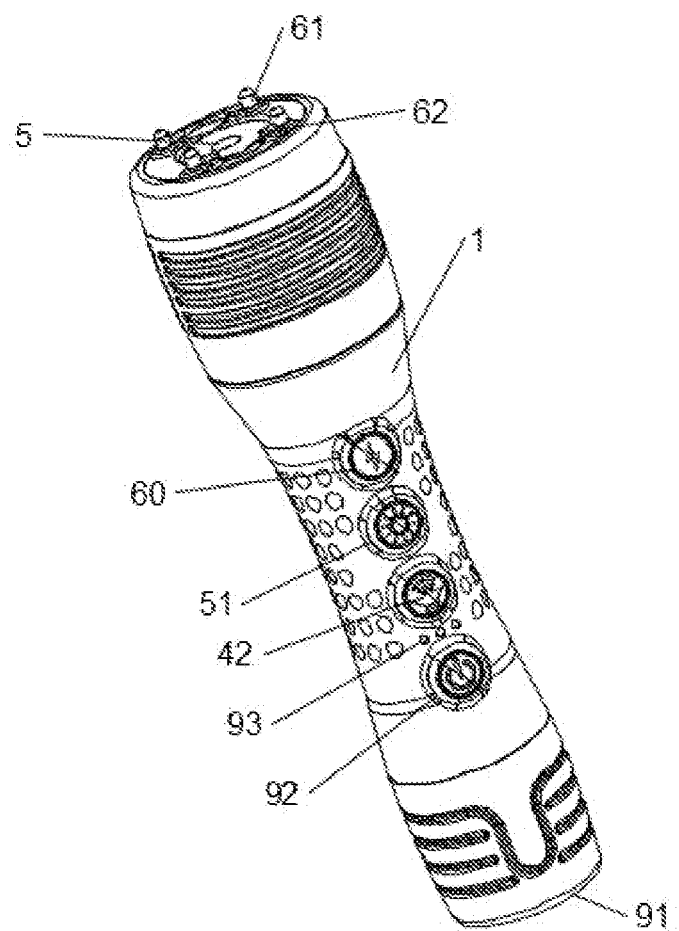
FIG. 1 shows a perspective view of an illuminating and alarming stun gun according to the invention.
Figure 2:
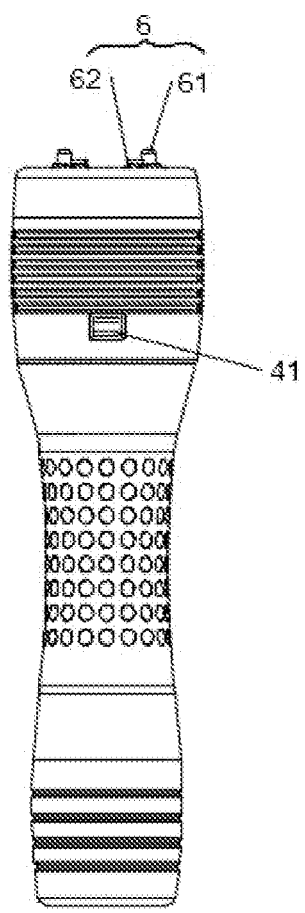
FIG. 2 shows a front view of the illuminating and alarming stun gun according to the invention.
Figure 3:
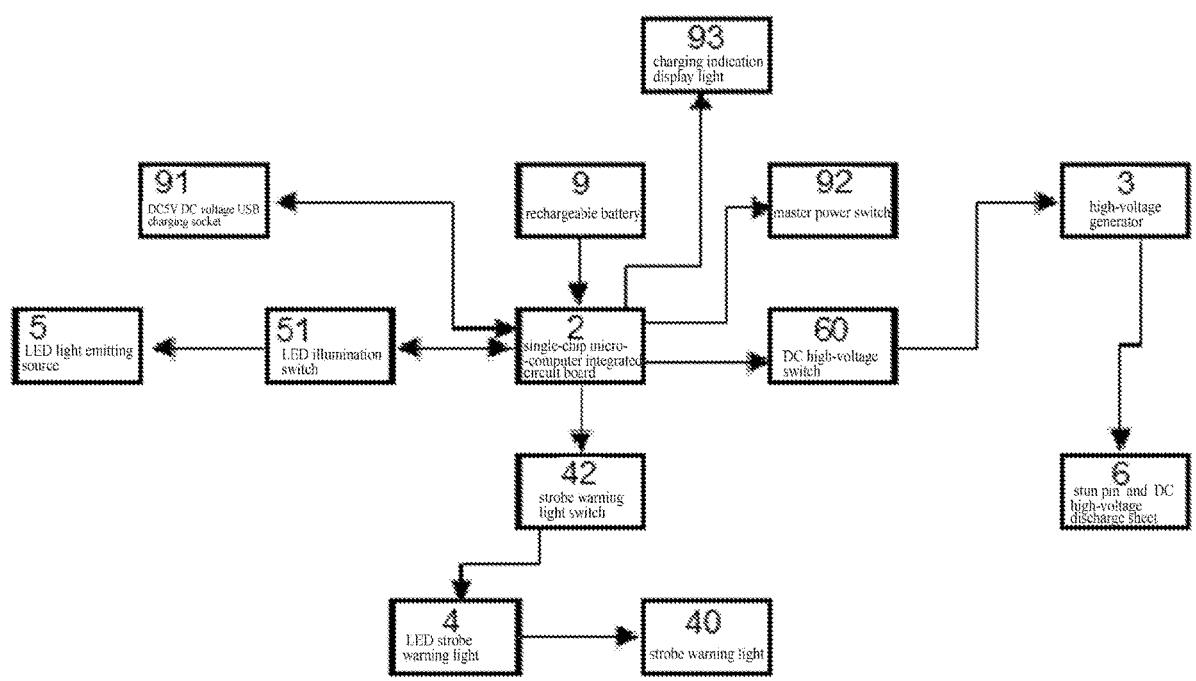
FIG. 3 shows a component connection diagram of the illuminating and alarming stun gun according to the invention.

As shown in FIGS. 1-3, an illuminating and alarming stun gun includes a main body shell 1 and a single-chip microcomputer integrated circuit board 2 arranged inside the main body shell 1, wherein a high-voltage generator 3, an alarm generator and LED strobe warning light 4 and a rechargeable battery 9 are further arranged inside the main body shell 1, the high-voltage generator 3, the alarm generator and LED strobe warning light 4 and the rechargeable battery 9 being connected to the single-chip microcomputer integrated circuit board 2 separately; four stun pins 61 are arranged at the head of the main body shell 1, an LED light emitting source 5 being arranged among the four stun pins 61, and the LED light emitting source 5 being in control connection to the single-chip microcomputer integrated circuit board 2 and in power supply connection to the rechargeable battery 9; stun pins 61 of the main body shell 1 are provided with separate DC high-voltage discharge sheets 62, the high-voltage DC discharge sheets 62 being in control connection to the single-chip microcomputer integrated circuit board 2 and in power supply connection to the rechargeable battery 9; the high-voltage generator 3 includes a DC inverse voltage transformer, a high-voltage silicon rectifier, a ceramic capacitor boost circuit and a discharge resistor which are in sequential connection, the DC inverse voltage transformer being connected to the rechargeable battery 9, and the discharge resistor being connected to the stun pins 61 and the DC high-voltage discharge sheets 62; and shielding films are installed on a line output transformer side of the single-chip microcomputer integrated circuit board 2 and a line output transformer side of the high-voltage generator 3 separately, a negative electrode being connected to the shielding films.

The main body shell 1 is provided with a stun and LED illumination switch 51 which is connected to the single-chip microcomputer integrated circuit board 2 and accesses an on-off control circuit of the LED light emitting source 5.

The alarm generator and LED strobe warning light 4 includes a loud speaker and strobe warning light 40 which is connected to the single-chip microcomputer integrated circuit board 2 and controlled by the same to give an alarm sound.

The main body shell 1 is provided with an alarm issuing hole 41, the loud speaker and strobe warning light 40 being installed on an inner side of the alarm issuing hole 41; and an alarm and strobe warning light switch 42 is arranged on an outer side of the main body shell 1, the alarm and strobe warning light switch 42 being connected to the single-chip microcomputer integrated circuit board 2 and accessing an on-off control circuit of the loud speaker and strobe warning light 40.

The main body shell 1 is provided with a DC high-voltage switch 60, the DC high-voltage switch 60 being connected to the single-chip microcomputer integrated circuit board 2 and accessing an on-off control circuit of the stun pin 61 and the DC high-voltage discharge sheet 62.

A DC5V DC voltage USB charging socket 91 is arranged at the bottom of the main body shell 1, the DC5V DC voltage USB charging socket 91 being in power supply connection to the rechargeable battery 9.

The main body shell 1 is provided with a master power switch 92, the master power switch 92 being connected to the single-chip microcomputer integrated circuit board 2 and accessing a connection circuit of the rechargeable battery 9.

The main body shell 1 is provided with a power amount display and charging indication display light 93, the power amount display and charging indication display light 93 being connected to the single-chip microcomputer integrated circuit board 2 and accessing a power amount monitoring circuit arranged on the single-chip microcomputer integrated circuit board 2, and the power amount monitoring circuit being connected to the rechargeable battery 9.

The main body shell 1 is of a long cylindrical plastic structure with a constricted waist.

The stun pins 61 and the DC high-voltage discharge sheets 62 are annularly and uniformly distributed.

The LED light emitting source 5 is an XML2LED light.

The DC inverse voltage transformer arranged inside the main body shell 1 is composed of a low-pressure plastic skeleton, a high-pressure multi-groove plastic skeleton and a ferrite high-frequency magnetic material. The discharge resistor has an action of consuming a current stored in an internal capacitor of the capacitor boost circuit when not operating, and people are protected against electric shock. The rechargeable battery 9 is a polymer lithium battery.

The main body shell 1 is of a split structure and includes a plastic upper cover and a plastic lower cover. The shielding films are installed on the line output transformer side of the single-chip microcomputer integrated circuit board 2 and the line output transformer side of the high-voltage generator 3 separately, and the negative electrode is additionally connected on the shielding films, such that anti-interference can be well performed. An insulating medium evenly coats an outer surface, and a reinforcement strip is fixedly installed on a back surface of a substrate configured to install internal components.

Pin shielding covers are fixedly installed on one side, close to the substrate, of all lead through holes, which can improve the shielding effect between electronic components and the anti-interference against a potential difference, and can improve the current guide capability while not affecting installation of other components of the circuit board.

When the illuminating and alarming stun gun of the application is used, the master power switch is long pressed for 1.5-2 seconds, and then an XML2 illumination switch, a strobe stun switch with four gears of strength, the alarm and strobe warning light switch and various functions of a buzzer piece are turned on. When the power amount is very low, the circuit will be turned off instead of stun, illumination or alarm, which can well prolong the service life of the lithium battery. During charging, a charging interface is directly inserted into a USB interface, the stun gun can be charged directly and three LED lights with the charging power amount displayed can be checked.

Using a single-chip microcomputer control device can effectively manage the circuit, and compress cumbersome wiring circuits and mechanical switches.

The illuminating and alarming stun gun of the application integrates multiple functions such as illumination, alarm and stun into a whole, is compact in structure and convenient to control and use, and can be subjected to program setting through the single-chip microcomputer integrated circuit board, so as to control on-off sequences and modes of each of all the functions, and become the controllable intelligent stun gun with various application modes.

The invention has been described in detail as above, the principles and the implementation of the invention are described herein by using the specific examples, and the above description of the embodiments are merely used for assisting in understanding a method of the invention and a core idea thereof; meanwhile, for those of ordinary skill in the art, the changes will be made on both the specific implementation and the scope of application according to the idea of the invention; and in summary, the contents of the specification should not be construed as limiting the invention.

Through the above description of the implementation, a person skilled in the art can clearly understand that the invention is implementable, certainly, the above-listed conditions are merely exemplary, and the invention is not limited thereto. It should be understood by a person skilled in the art that other variations or simplifications according to the technical solution of the invention may all be appropriately applied to the invention and should fall within the scope of the invention.

I claim:

1. An illuminating and alarming stun gun, comprising a main body shell (1) and a single-chip microcomputer integrated circuit board (2) arranged inside the main body shell (1), wherein a high-voltage generator (3), an alarm generator and LED strobe warning light (4) and a rechargeable battery (9) are further arranged inside the main body shell (1), the high-voltage generator (3), the alarm generator and LED strobe warning light (4) and the rechargeable battery (9) being connected to the single-chip microcomputer integrated circuit board (2) separately; four stun pins (61) are arranged at the head of the main body shell (1), an LED light emitting source (5) being arranged among the four stun pins (61), and the LED light emitting source (5) being in control connection to the single-chip microcomputer integrated circuit board (2) and in power supply connection to the rechargeable battery (9); the stun pins (61) of the main body shell (1) are provided with separate DC high-voltage discharge sheets (62), the DC high-voltage discharge sheets (62) being in control connection to the single-chip microcomputer integrated circuit board (2) and in power supply connection to the rechargeable battery (9); the high-voltage generator (3) comprises a DC inverse voltage transformer, high-voltage silicon rectifier, a ceramic capacitor boost circuit and a discharge resistor which are in sequential connection, the DC inverse voltage transformer being connected to the rechargeable battery (9), and the discharge resistor being connected to the stun pins (61) and the DC high-voltage discharging sheets (62); and shielding films are arranged on a line output transformer side of the single-chip microcomputer integrated circuit board (2) and a line output transformer side of the high-voltage generator (3) separately, a negative electrode being additionally connected to the shielding films.

2. The illuminating and alarming stun gun according to claim 1, wherein the main body shell (1) is provided with a stun and LED illumination switch (51) which is connected to the single-chip microcomputer integrated circuit board (2) and accesses an on-off control circuit of the LED light emitting source (5).

3. The illuminating and alarming stun gun according to claim 1, wherein the alarm generator and LED strobe warning light (4) comprises a loud speaker and strobe warning light (40) which is connected to the single-chip microcomputer integrated circuit board (2) and controlled by the same to give an alarm sound.

4. The illuminating and alarming stun gun according to claim 3, wherein the main body shell (1) is provided with an alarm issuing hole (41), the loud speaker and LED strobe warning light (40) being installed on an inner side of the alarm issuing hole (41); and an alarm and strobe warning light switch (42) is arranged on an outer side of the main body shell (1), the alarm and strobe warning light switch (42) being connected to the single-chip microcomputer integrated circuit board (2) and accessing an on-off control circuit of the loud speaker and strobe warning light (40).

5. The illuminating and alarming stun gun according to claim 1, wherein the main body shell (1) is provided with a DC high-voltage switch (60), the DC high-voltage switch (60) being connected to the single-chip microcomputer integrated circuit board (2) and accessing an on-off control circuit of the stun pins (61) and the DC high-voltage discharge sheets (62).

6. The illuminating and alarming stun gun according to claim 1, wherein a DC5V DC voltage USB charging socket (91) is arranged at bottom of the main body shell (1), the DC5V DC voltage USB charging socket (91) being in power supply connection to the rechargeable battery (9).

7. The illuminating and alarming stun gun according to claim 1, wherein the main shell (1) is provided with a master power switch (92), the master power switch (92) being connected to the single-chip microcomputer integrated circuit board (2) and accessing a connection circuit of the rechargeable battery (9).

8. The illuminating and alarming stun gun according to claim 7, wherein the main body shell (1) is provided with a power amount display and charging indication display light (93), the power amount display and charging indication display light (93) being connected to the single-chip microcomputer integrated circuit board (2) and accessing a power amount monitoring circuit arranged on the single-chip microcomputer integrated circuit board (2), and the power amount monitoring circuit being connected to the rechargeable battery (9).

9. The illuminating and alarming stun gun according to claim 1, wherein the main body shell (1) is of a long cylindrical plastic structure with a constricted waist.

10. The illuminating and alarming stun gun according to claim 1, wherein the stun pins (61) and the DC high-voltage discharge sheets (62) are annularly and uniformly distributed.

* * * * *